3,338,423
CARGO TRANSPORTING DEVICE
Roy Lee Wellman, Jr., Columbus, Ohio, assignor to Federated Department Stores, Inc., Columbus, Ohio, a corporation of Delaware
Filed Aug. 9, 1965, Ser. No. 478,224
10 Claims. (Cl. 211—162)

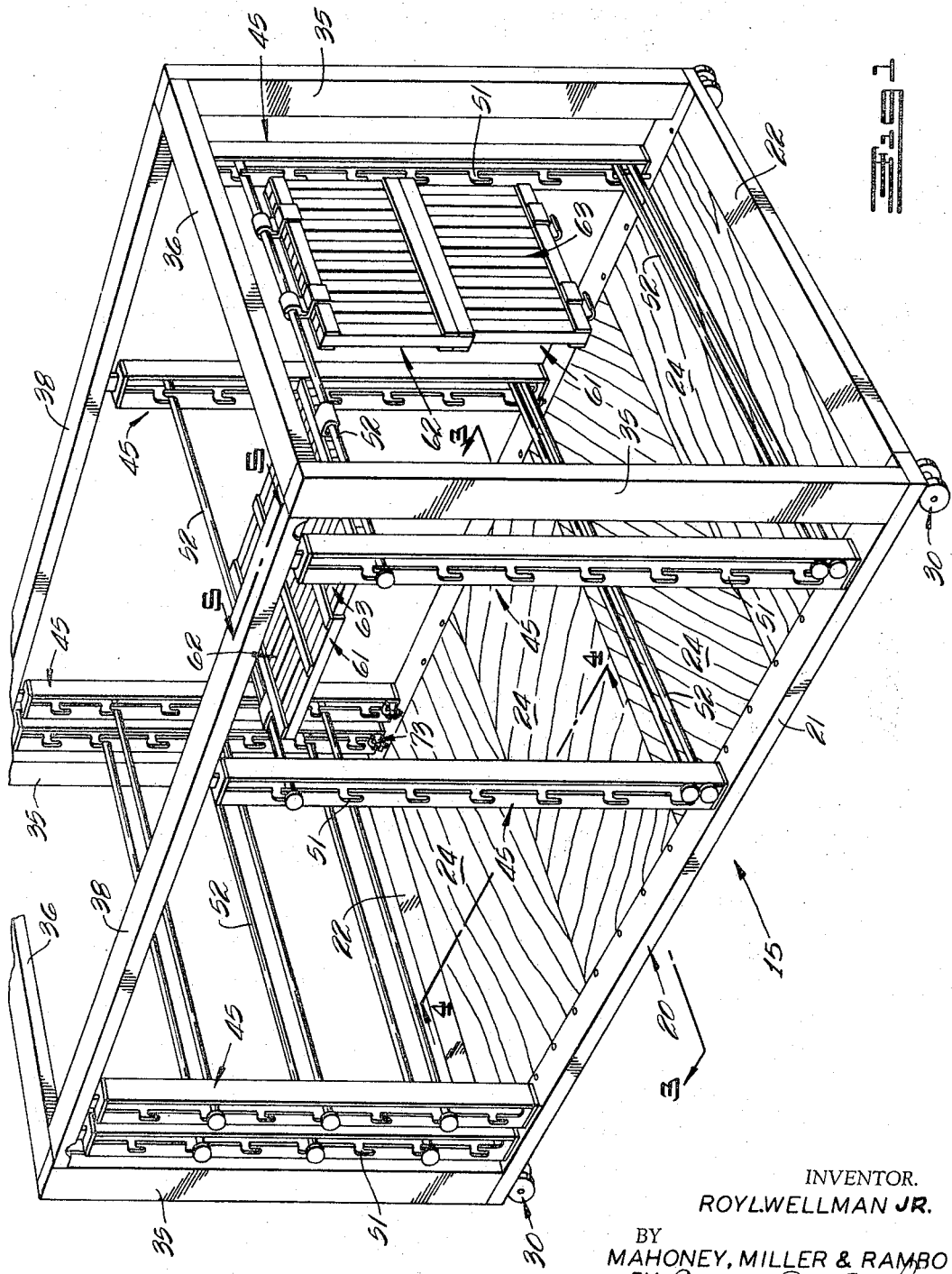

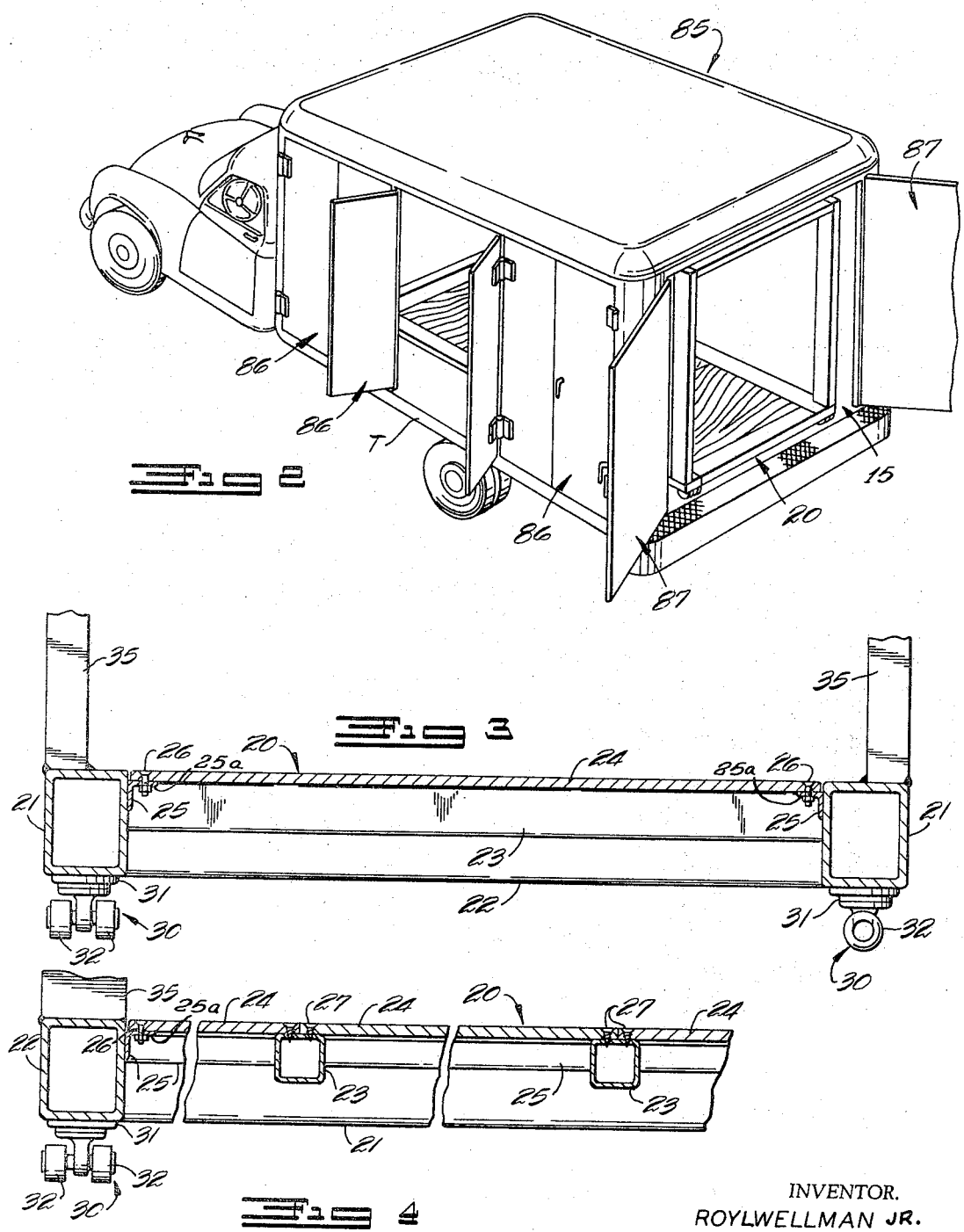

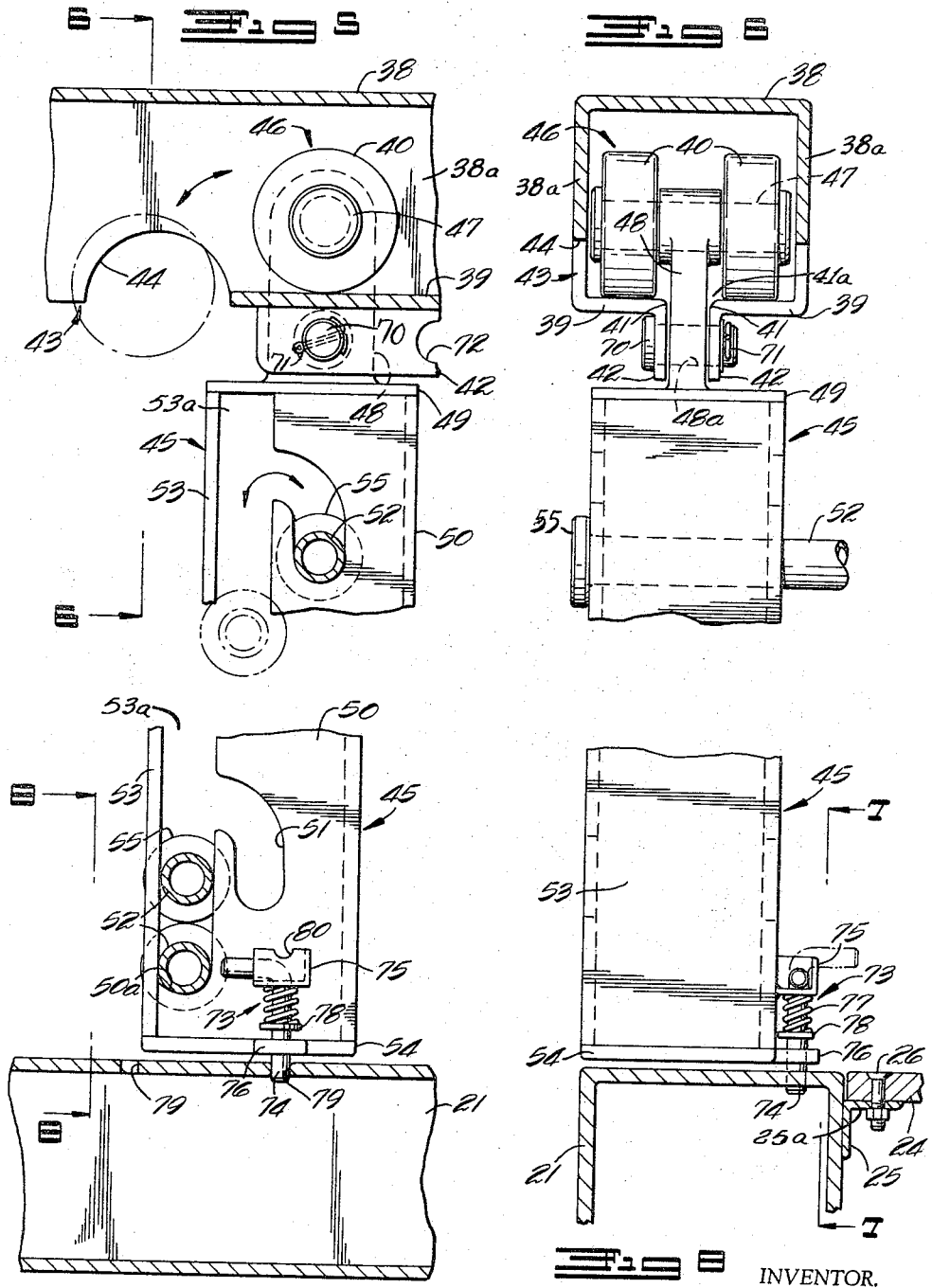

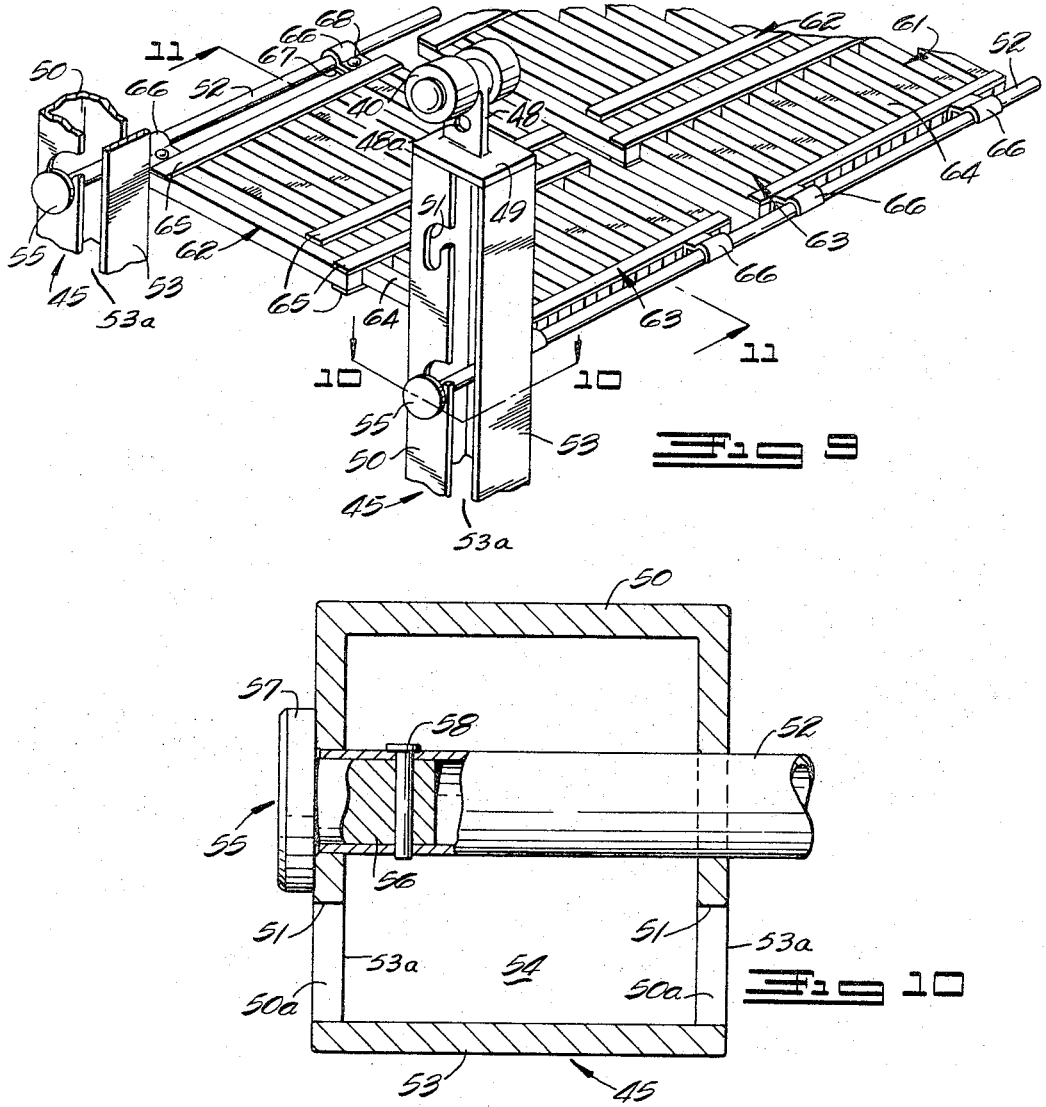

This invention relates, in general, to article transporting apparatus and to a transportation system utilizing the apparatus. It relates, more specifically, to an article transporter of the wheeled type which is adapted to be carried by a motor vehicle and which is particularly adapted to transportation of bulk-type articles.

The article transporting apparatus of this invention is designed, in particular, for utilization in the delivery of bulk-type articles within a metropolitan area. It may be advantageously utilized by retail merchants who handle large bulky items, such as furniture, or by delivery services or organizations which contract to perform the delivery service for a retail merchant. The prior practices of retail merchants or delivery services concerned with delivery of such articles have generally resulted in inefficient operation as will be apparent from a brief generalized description of a typical prior practice. In accordance with such practices, the articles which are to be delivered are accumulated in a warehouse or loading area the day preceding the proposed date of delivery. On the date of delivery, the articles are removed from the warehouse and loaded onto a suitable delivery van or truck and subsequently distributed to the respective purchasers. These articles which are to be delivered may be of varied shapes and sizes such as a varied assortment of furniture articles with very few of the articles being packed in suitable shipping crates. As such, the articles in a typical consignment will comprise odd-shaped units which are difficult to arrange within a customary delivery van and may be of a weight and configuration which prevents economical loading of the closed-van type vehicles customarily utilized for distribution and delivery. In addition, it is necessary to utilize considerable packing material or mats to protect the finished surfaces of the articles and prevent their damage necessitating return for replacement or repair with consequent economic loss to the retail merchant. Delivery of furniture articles, in accordance with the present practice, requires that the articles be loaded into the van and packed, sometimes in multiple layers, to more economically utilize the space of the delivery truck. Multiple layer packing, however, does increase the hazards and the possibility of sustaining damage necessitating return of the merchandise for replacement or repair.

A further disadvantage of the present system and practice for delivery of such bulk-type items as furniture is the time consumed in the loading process on the day of delivery and the scheduling problems involved in determining the number and type of delivery trucks or vans required to handle the daily order flow. With the usual business practices, the articles which are ordered on one day are accumulated in a designated area of the warehouse or adjacent the shipping dock the same day, if possible, and are delivered to the purchasers the following day. As the articles are accumulated in the warehouse shipping area, they are placed in designated areas according to specific delivery points or areas within the metropolitan area and are subsequently loaded into the delivery vans which are assigned to the specific area. This system requires that a considerable amount of warehouse space be reserved for accumulation of the articles prior to delivery. Often the articles are temporarily stored on shelves or racks within a relatively large area for each truck or van to facilitate identification and location of the articles and avoid the necessity of stacking the articles in multiple layers. On the day of delivery, the articles are then transferred from the storage area to the specific truck or van and are loaded in a sequence which will facilitate the delivery of the articles along a predetermined route. The route is normally ascertained and determined from a consideration of the articles which are assigned for delivery by a particular truck. This arrangement, however, prevents the orderly arrangement of the articles within the van to most advantageously utilize the space. Frequently, it is necessary to load the articles in the van in such a manner that it is necessary for the driver and his helper, at the time of delivery, to unload and reload or otherwise rearrange some of the articles to permit delivery of the desired article.

Wheeled type article transporting apparatus designed to be carried by a motor vehicle for long distance transportation are well known in the art but are widely utilized only for the transportation of items which may be conveniently boxed and stacked on movable pallet-type skids or apparatus with all of the articles carried by a specific transporting apparatus designated for a single point delivery. The most common forms of the prior art article transporting apparatus comprise a flat base platform which may be mounted on skids or on rollers to facilitate the movement thereof into or onto a truck body or platform. Often the prior art transporting apparatus may be provided with side walls or covers to further contain the articles being transported or to increase the protection afforded. Utilization of the prior art type transporting apparatus, therefore, is generally limited to the transportation of articles which may be conveniently boxed or crated prior to placement on the transporting apparatus with each apparatus being delivered as a unit to a single point.

It is, therefore, the primary object of this invention to provide an article transporting apparatus which is adapted to receive and carry bulk-type articles, such as furniture, which are not boxed or crated and which may be readily moved when loaded onto a motor vehicle.

It is another important object of this invention to provide an article transporting apparatus having a novel adjustable shelf structure adapted to support articles thereon for transportation to permit stacking without contact between the articles.

It is another object of this invention to provide an article transporting apparatus for a delivery system in which the article transporting apparatus may be utilized for the accumulation of the articles to be delivered and when loaded, positioned on a motor vehicle for distribution permitting selective delivery from the apparatus without rearrangement of the articles.

It is also an object of this invention to provide an article transporter having a novel adjustable shelving arrangement which is of rugged construction and which is readily adaptable to the support and transportation of groups of articles of varied sizes and shapes.

These and other objects and advantages of of the present invention will be readily apparent from the following detailed description thereof and the accompanying drawings.

In the drawings:

FIGURE 1 is a perspective view of an article transporting apparatus embodying the present invention.

FIGURE 2 is a perspective view of a motor vehicle having a van-type body specifically designed to receive and advantageously utilize the article transporting apparatus of this invention.

FIGURE 3 is a fragmentary enlarged sectional view taken along line 3—3 of FIGURE 1.

FIGURE 4 is a fragmentary sectional view taken along line 4—4 of FIGURE 1.

FIGURE 5 is a vertical sectional view taken along line 5—5 of FIGURE 1 showing the track means and the vertical strut supporting rollers.

FIGURE 6 is a vertical sectional view taken along line 6—6 of FIGURE 5.

FIGURE 7 is an enlarged sectional view taken along line 7—7 of FIGURE 8 showing the details of the locking mechanism for securing the lower ends of the vertical struts to the base platform.

FIGURE 8 is a vertical sectional view taken along line 8—8 of FIGURE 7.

FIGURE 9 is a perspective view of a shelf structure and associated supporting bar and vertical strut on an enlarged scale showing the details of construction thereof.

FIGURE 10 is an enlarged horizontal sectional view taken along line 10—10 of FIGURE 9.

FIGURE 11 is a vertical sectional view of the shelf structure taken along line 11—11 of FIGURE 9.

Having reference to the drawings, an article transporting apparatus or transporter embodying the present invention is illustrated in detail in the several figures. Referring specifically to FIGURE 1, the article supporter and transporter 15 is seen to comprise a base platform designated generally by the numeral 20 and a novel adjustable shelving structure. The shelving structure is carried on the base platform and is selectively positionable thereon, both vertically and horizontally, to facilitate the loading of the articles and to provide horizontally disposed supporting surfaces or platforms for multi-level stacking of the articles. As will be more fully explained hereinafter, the shelf structure may be adjusted and positioned to accommodate articles which extend the full height of the transporter as well as smaller articles which may be stacked in layers for economical space utilization. The article transporters 15 may be constructed in any size which is suitable for a particular application. In the illustrated application, the article transporter 15 is designed to fit within the van-type body of a delivery truck. Such a van-type body is shown in FIGURE 2 although the illustrated body is specifically designed for utilization with the article transporter of FIGURE 1. This van-type body has the approximate dimensions of 19 ft. long, 7½ ft. wide, and 7 ft. high with the transporter designed accordingly. Other dimensional configurations may be utilized for specific applications. For example, a multiple of transporters may be designed to fit within a particular van body or on a truck as in the case of trailer-type highway vehicles. In that instance, three or four such transporters could conveniently be positioned within a trailer body.

The base platform 20 comprises a rigid frame of welded steel construction formed from a pair of longitudinally extending side rails 21 and interconnecting end rails 22. The side and end rails 21 and 22 are preferably box-type, tubular girders to provide the necessary structural rigidity. At least three cross members 23 are also provided to increase the rigidity of the structure and provide support for the central floor covering. The cross members 23 are also tubular box-type girders and are welded to the side rails 21. Supported by the frame and the cross members is a suitable floor covering which forms an upper article-supporting surface for the articles to be carried by the transporter. This floor covering may be formed from a number of plywood panels 24. Providing support and means of attachment for the several plywood panels 24 are several angle brackets 25 which extend about the inner periphery of the side and end rails, 21 and 22. These angle brackets 25, which may be secured to the rails by welding, include an upper horizontally disposed flange 25a which projects a distance inwardly from the face of the rails. This horizontally disposed flange 25a forms a supporting ledge on which the plywood panels 24 may be supported. A number of suitable fastening devices, such as bolts 26, extend through the marginal edges of the panels 24 and into the angle brackets 25 to secure the panels in the desired position. The cross members 23 also provide support for the panels and are positioned with the upper surface of each of the cross members in alignment with the upper surface of the angle brackets 25. Additional screw-type fastening devices 27 may be utilized in securing the floor covering plywood panels 24 to the cross members 23. In the present embodiment of the transporter, the floor covering panels 24 are positioned with the surface thereof aligned with the upper surface of the end and side rails 21 and 22 forming a smooth continuation thereof.

Movement of the transporter 15 is facilitated by means of several wheel caster assemblies 30 which are secured to the rigid frame of the base platform. Four such caster assemblies 30 are utilized in the present embodiment. Each of the caster assemblies includes an attachment plate 31 which is rigidly secured to the rails as by welding and is adapted to permit swiveling of the caster wheels. Preferably, the caster assemblies are of the type having two wheels 32 to provide adequate load-bearing capacity for the transporter without excessively increasing the elevation of the platform surface.

Rigidly secured to each end of the base platform 20 is an upstanding, U-shaped frame assembly. This frame assembly includes the vertically disposed support members 35 and the cross brace 36 secured and interconnecting the upper ends of the support members. Each of the vertical support members 35 is positioned in a respective corner of the base platform. This frame assembly is also of welded construction utilizing box-type, tubular structural members with the end of the support members 35 being welded to the side rails 21 of the base platform.

Supported by the upstanding end frame assemblies are guide or track means from which the shelf structures are supported. Each track means comprises a box-type girder 38 which extends longitudinally of the base platform. The ends of each of the girders 38 are rigidly secured to the vertical support members 35 of the end frame assemblies and are disposed vertically above the side rails 21 of the base platform. Each girder 38, which is of a generally box-shape as can be best seen by reference to FIGURES 5 and 6, is formed with two horizontally disposed flanges 39 at the bottom side thereof. The flanges 39 form guide or track rails along which a pair of rollers 40 may readily travel. The flanges 39 terminate in opposed, longitudinally extending edges 41 which are relatively spaced apart and form a slot 41a therebetween. Formed with each of the horizontal flanges 39 at the central longitudinal edge 41 is a vertically disposed flange 42 which projects a distance downwardly therefrom. The pair of vertically disposed flanges 42 increase the rigidity of horizontal track rails 39 and form a locking rail for purposes to be explained hereinafter. A portion of the track rail flanges 39 and associated vertical flanges 42 are removed at one end of each girder 38 as at 43 to provide an opening through which the rollers 40 may readily pass. In addition, a semicircular cut-out 44 may be formed in the vertical side walls 38a of the girder to further facilitate passage of the rollers 40.

Carried by each of the track means are at least two vertically disposed struts 45 which provide the structural support for the shelf structure. Each of the vertical struts 45 is suspended from the respective girder 38 by a roller assembly 46 which includes the two rollers 40. The rollers 40 are rotatably mounted on a shaft 47 which carries a centrally disposed attachment plate 48. The attachment plate 48 is of a length to project a distance below the lower edge of the locking rails 42. Secured to the lower end of the attachment plate 48 is the top end-plate 49 of the vertical struts. Each of the struts comprises a main body 50 which may be formed from a structural channel which is secured at one end to the end plate 49 with the side flanges of the channel disposed parallel to the longitudinal axis of the platform. All of the struts 45 are positioned with the open side of the channel body facing in the same direction.

Formed in the side flanges of the channel body 50 are a number of aligned bayonet slots 51 which open at the edges of the flanges. The bayonet slots 51 are uniformly spaced apart to provide vertical alignment and horizontal support of one or more horizontally disposed support bars 52 on each pair of struts 45 positioned at opposite sides of the platform 20. These support bars 52 may be formed from cylindrically shaped, elongated shafts and may be of tubular construction. The support bars 52 provide vertically adjustable, horizontal supports for the shelf structures and are appropriately designed for adequate strength for the intended application. Accordingly, each slot 51 is of a width to readily receive a support bar 52 to permit positioning of the bar at the base or terminal end of the slot.

As illustrated in FIGURE 1 where three support bars 52 are shown with each pair of vertical structs 45, it is desired that the support bars 52 be retained with the respective vertical struts 45 to assure their ready accessibility for use when desired. Forming a storage space for the several support bars 52 which are to be carried by each strut is a vertically extending plate 53 which is disposed in spaced relationship to the channel body 50 at the open side of the channel. Attachment of the plate 53 to the strut is made through welding of the upper end of the plate 53 to the top end plate 49 which projects a distance outwardly from the open side of the channel body 50 and welding of the lower end to the bottom end-plate 54 secured as by welding to the lower end of the channel body 50. The plate 53 is supported in spaced parallel relationship to the longitudinal edges of the channel flanges and forms a slot 53a therewith having a width slightly greater than the diameter of the support bars 52. Thus, the support bars 52 may be vertically displaced through this slot 53a to the desired bayonet slot 51 in which they are intended to be positioned. The elongated slot 53a thus formed by the plate 53 and the channel body 50 extends a distance slightly below the lowermost bayonet slot 51, as can be best seen in FIGURE 7, providing a storage space for at least two of the support bars 52 which may not be in use at any particular time. Forming the base of this slot 53a is a lateral extension of the flanges of the channel body 50 which project to the plate 53 and may be secured thereto. The upper surface edges of this extension may be arcuately curved as at 50a for receiving the cylindrically shaped support bar 52. This extension assures that the support bars 52 will be maintained above the horizontal surface of the base platform 20 and particularly the side rails 21.

Each of the support bars 52, as previously indicated, comprises a cylindrically shaped, elongated shaft of tubular construction which extends between a pair of vertical struts 45 positioned in alignment at opposite sides of the base platform. Each bar 52 is of a length to extend to the outer flange of the channel body 50 and to be supported by each of the flanges in a particular bayonet slot 51. An end cap 55 is secured to each end of a support bar 52 to assure that the bar will not be removed from the respective struts 45 and inadvertently misplaced or lost. Each end cap comprises a cylindrical stub shaft 56 adapted to be inserted within the marginal end portion of the tubular support bar 52 and has an enlarged circular head portion 57 formed at one end thereof. The diameter of the circular head portion 57 is such as to prevent its displacement through either the bayonet slots 51 or the vertical displacement slot 53a formed by the channel body 50 and the plate 53. A rivet type pin 58 extending through aligned apertures formed in the tubular bar 52 and the stub shaft 56 secures the end cap 55 to the support bar.

The shelf structures, designated generally by the numeral 61 and best shown in FIGURES 1, 9 and 11, are adapted to be supported in vertically spaced, overlying relationship to the base platform 20 by means of horizontal positioned pairs of support bars 52. Each of the shelf structures 61 is of a construction permitting longitudinal adjustment thereof in accordance with the specific spacing of the horizontally disposed support bars 52 and consequently provide variation in the effective article supporting surface area available in accommodation of a specific loading configuration of the transporter. In the present embodiment, which is illustrated in the drawings, each shelf structure 61 comprises two telescopically assembled sections which are designated herein as the base section 62 and the extendible section 63. Both sections 62 and 63 are of similar construction and comprise a multiplicity of spaced parallel tubular bars 64 assembled in a common plane and adapted to be interleaved. The bars 64 forming each section are assembled in fixed relationship forming a rigid structure by pairs of transversely extending connector straps 65. A pair of these straps 65 are welded to the opposite surfaces of the bars 64 at both marginal end portions of section 62 and 63 with the straps connected to the interleaved marginal end portions providing an interlocking connection preventing the separation of the sections. To minimize the weight of the shelf structure while retaining the necessary structural rigidity for the support of articles thereon, the bars 64 may be formed from elongated tubular steel stock having a square cross section. With the spacing between each adjacently disposed pair of bars 64 beings substantially equal to the width of the bars of the opposite section to be interleaved therewith, a rigid shelf structure is formed which may be readily adjusted as to length providing the desired shelf area for support of articles thereon.

Attachment of the shelf structure 61 to the respective support bars 52 is accomplished by means of a pair of hanger brackets 66 secured in transversely spaced relationship to each end edge of the respective sections 62 and 63 of the shelf structure. Each of the hanger brackets 66 is designed to detachably engage the respective bar 52 to permit removal of the shelf structure. In the illustrated embodiment in FIGURES 1, 9 and 11, the brackets may be seen to comprise an L-shaped section which is secured to the bars 64 and straps 65 of the respective section 62 or 63 and a downwardly extending loop formed at the terminal end. The downwardly extending loop is adapted to extend partially around the support bar 52 in releasable engagement therewith. To prevent inadventent disengagement of the brackets 66 from the respective support bar 52 as may result from bouncing of the transporting vehicle, at least one pair of brackets 66 may be provided with locking clips 67. Each locking clip 67 extends about the lower surface of the support bar 52 and is secured to the bracket 66 by a bolt 68 and wing nut 69 through parallel disposed flange portions thereof.

The width of each shelf structure 61 is determined by the particular transporter design. In the illustrated embodiment, two shelf structures 61 may be supported on each pair of support bars 52 as shown in FIGURES 1 and 9 with each shelf structure being of a width equal to one-half the width of the transporter. Only one such shelf structure may be utilized if desired, as indicated in FIGURE 1, thus permitting a relatively tall article to occupy the adjacent space on the base platform 20. Alternatively, both shelf structures 61 may be supported on the same pair of bars 52 to form a larger article-supporting surface, as shown in FIGURE 9. If desired, the shelf structure 61 not being utilized may be permitted to hang vertically from only one support bar, as shown in FIGURE 1, or if this in inconvenient, may be entirely removed through disengagement of the locking clips 67 and stored elsewhere. It will also be apparent that the width of the shelf structure 61 may be increased to extend across the entire width of the transporter where only one shelf structure may be supported by each pair of support bars 52 or the shelf structure 61 may be decreased in width to permit utilization of more than two shelf structures for each pair of support bars 52.

In the utilization of the transporter of this invention, the vertical struts 45 are first positioned longitudinally of the base platform 20 at the point where it is desired to support an article to be transported in vertically spaced relationship to the surface of the base platform. The longitudinal spacing of the vertical struts 45 would thus be determined by the size of the particular article to be supported and the struts would be appropriately positioned. A support bar 52 in each of the pairs of vertical struts would then be elevated and positioned in the desired bayonet slot 51 corresponding to the elevation at which it is desired to position the shelf structure 61. This would be accomplished by merely lifting the support bars 52 through the vertical slot 53a formed by the plate 53 and the channel body 50 and inserting the bar in the desired slot 51. The shelf structure or structures 61 are then positioned on the support bars 52, as indicated in FIGURE 1 or FIGURE 9. This is accomplished by relatively extending the sections 62 and 63 to permit engagement of the hanger brackets 66 with the respective support bars 52. It is to be understood, however, that the spacing of the vertical struts 45 will be limited by the maximum possible extension of the shelf structures 61. After the shelf structures 61 have been thus positioned, the articles to be transported may then be positioned on the shelf as desired. Where the article or articles to be supported by the shelf structures 61 requires a surface area having a lengthwise dimension greater than that obtainable with a single shelf structure, a third pair of struts 45 may be positioned relative to the first and second pairs to support additional shelf structures as may be required. Also, a single support bar 52 may be disposed in an elevated position to serve as a convenient tie point for tall articles having a relatively high center of gravity.

It is desirable that the vertical struts 45 be fixed in their selected positions relative to the girders 38 and the side rails 21 to prevent inadvertent motion or movement during transport. Such movement may be induced by acceleration or deceleration of the vehicle on which the transporter is carried. Accordingly, locking means are provided at the upper and lower ends of each of the vertical struts 45 to fix the struts in the desired longitudinal position relative to the base platform 20 and the track means 38. The locking means at the upper end of the vertical struts 45 comprises a pin 70 which may be inserted through a selected one of a number of aligned apertures 72 formed in the vertical flanges 42 at the bottom of each of the box girders 38. The attachment plate 48 of each strut 45 is also provided with an aperture 48a which is aligned with the apertures 72 formed in the flanges 48. The pin 70 is formed with an enlarged head portion at one end and is retained in the aligned apertures by means of a suitable locking or fastening device such as a cotter pin 71. Disengagement of the locking device 71 from the pin 70 will permit removal of the pin 70 and subsequent longitudinal displacement of the vertical strut 45 relative to the track means 38. Subsequent realignment of a selected pair of apertures 48a and 72 in the attachment plate 48 and the flanges 42 will permit reinsertion of the pin 70 and engagement of the locking devices 71 therewith to retain the vertical strut in the desired position relative to the track means 38.

Locking of the strut 45 at the lower end is accomplished by means of a spring biased latch mechanism 73. Each latch mechanism 73 comprises a bolt 74 carried by the strut 45 and movable into latching engagement with the side rail 21 of the base platform. The bolt 74 is of an L-shape with one leg forming an operating handle. The other leg forms a locking bolt and is movable vertically being supported by a bracket 75 and a lug 76 which are secured to a side flange of the channel 50 in vertically spaced relationship. The bracket 75 and lug 76 are formed with aligned apertures through which the bolt 74 may be vertically displaced. Biasing of the bolt 74 into locking relationship with the side rail 21 is effected by means of a spring 77 positioned on the bolt and operating against the base of the bracket 75 and a stop washer or collar 78 fixed on the bolt. A series of apertures 79 are formed in the upper horizontally disposed flange of the side rails 21 in longitudinally spaced relationship for receiving the terminal end of the bolt 74. The spacing and positioning of the apertures 79 are related to the spacing of the apertures 72 formed in the flanges 42 to assure vertical positioning of the struts 45. An upstanding flange of the bracket 75 is formed with a detent 80 to permit positioning and maintenance of the bolt 74 in an unlocked or disengaged position.

The cargo transporter 15 of this invention is adapted for transport in a suitable vehicle and, accordingly, should be secured or held in fixed relationship thereto when loaded for transport. This may be accomplished by using tie-down strapping to secure the transporter to the van body at tie-down points in accordance with conventional loading practices or specifically designed tie-down equipment may be provided.

The article supporting and transporting apparatus of this invention is specifically designed for utilization in distribution systems where a single motor vehicle, such as the well known van-type truck, is required to deliver the articles to the purchasers in a designated area or along a specified route. As previously indicated, the transporter 15 would be loaded with the articles to be delivered by a truck prior to the date of delivery and is then merely rolled onto the truck on the date of delivery. The usual van-type delivery trucks are only provided with rear access doors and the transporter would necessarily be loaded in an appropriate sequence to facilitate unloading as determined by the most expeditious delivery route. If necessary, the delivery route could be modified for more advantageous loading of the transporter as to space utilization and arrangement of the articles. During the delivery operation, as the articles are removed, the shelf structures and vertical struts would be disassembled and positioned on the transporter to facilitate access to the articles remaining on the transporter.

To further the advantageous utilization of the transporter 15, as in conjunction with the van-type delivery trucks, it is contemplated that a truck chassis would be provided with a modified van body. Such a modified van body 85 is illustrated in FIGURE 2 as mounted on a truck chassis T. This van-type body 85 is provided with several access doors 86 on each side as well as a conventional access door 87 at the rear. The rear access door 87 would be utilized for placement of the transporter 15 within the van body as well as delivery of articles loaded on the transporter at the end portion adjacent the rear access doors. The side doors 86 would be utilized for delivery of articles which would be positioned adjacent the respective sides of the van body. For convenience of the driver, the delivery invoices could be provided with suitable notation indicating the specific location of the article on the transporter. Since the articles would be readily accessible at any point on the transporter with this type of van body, the transporters may be more advantageously loaded than with the single rear access door van bodies. To further facilitate utilization of the transporter, it is desirable that the truck chassis be of the type having small diameter wheels which permits construction of a relatively low level truck bed. The articles are thus more readily accessible and permit the driver to climb into the van body with relative ease.

The use of the transporter of this invention is not limited to route-type deliver operations as previously described. It is also useful for intra-organization distribution such as in a warehouse or between a warehouse or shipping and receiving point and display or storage area. In this instance, several of the transporters may be carried by a single semi-trailer type vehicle where a large number of articles are to be transported. The transporter may also be readily utilized within a display or storage area for multi-point distribution of the articles carried.

It is readily apparent from the foregoing detailed description of an embodiment thereof, that the article transporting apparatus of this invention greatly facilitates the distribution or transportation of bulk-type articles. The adjustability of the shelving structure both vertically and horizontally readily accommodates a large number of articles having varied structural shapes on a particular transporter. The articles may be readily stacked independently of each other thereby preventing damaging interaction between articles. The articles may be loaded or unloaded from the transporter without interference or consideration of other articles. The apparatus may be ruggedly constructed economically and enhances the distribution or delivery operation through its mobility.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An article transporting apparatus comprising a base platform having an upper surface for receiving and supporting articles thereon, said platform being provided with ground engaging means facilitating the movement thereof, track means mounted on said base platform including two elongated track rails disposed in spaced parallel relationship and supported in elevated, longitudinally extending relationship to said base platform, at least two elongated struts carried by each of said track rails, each of said struts being vertically suspended from the respective track rail by means facilitating selective positioning of the strut longitudinally of said track rail, at least one elongated support bar carried by each pair of oppositely positioned struts and extending transversely of said platform, each of said bars being vertically positionable on a respective pair of struts at a selected elevation, and at least one shelf structure adapted to be supported by a pair of said support bars which are carried by respective pairs of said struts disposed in spaced apart relationship, said shelf structure having a surface for supporting articles thereon and having means attached thereto for detachably engaging said support bars.

2. An article transporting apparatus according to claim 3 wherein said shelf structure includes two telescopically assembled sections which are relatively displaceable longitudinally to form an article supporting surface of selected area.

3. An article transporting apparatus according to claim 4 wherein each section of said shelf structure comprises a multiplicity of spaced parallel bars disposed in a common plane with the bars of each section adapted to interleave with the bars of the opposite section.

4. An article transporting apparatus according to claim 3 wherein each of said struts comprises a main body having a plurality of vertically spaced slots formed therein and adapted to receive one of said support bars, each of said slots opening at a vertical surface of the main body of said strut to permit interchange of a support bar therewith.

5. An article transporting apparatus according to claim 6 wherein each of said struts includes an elongated member rigidly secured to the main body thereof in spaced parallel relationship to the surface thereof at which said slots open forming a slot therewith through which said support bars may be selectively displaced.

6. An article transporting apparatus according to claim 3 wherein each of said struts is provided with a roller assembly secured to the upper end thereof and engageable with a respective one of said track rails to facilitate movement of a strut relative to said track rail.

7. An article transporting apparatus according to claim 3 having locking means for securing each end of said struts in fixed relationship to said track means and said base platform.

8. An article transporting apparatus comprising a base platform having an upper surface for receiving and supporting articles thereon and including ground engaging means facilitating the movement thereof, track means mounted on said base platform including two elongated track rails disposed in spaced parallel relationship and supported in elevated, longitudinally extending relationship to said base platform, at least two elongated struts vertically suspended from each of said track rails, each of said struts being suspended from the respective track by means facilitating displacement thereof longitudinally of said track rails to a selected position, at least one elongated support bar carried by each pair of struts which are disposed at opposite sides of said platform, said bar extending transversely of said platform and being vertically positionable on said struts at a selected elevation, and at least one shelf structure adapted to be carried by a pair of longitudinally spaced support bars in horizontally disposed, overlying relationship to said base platform for receipt and support of articles thereon, said shelf structure including two telescopically assembled sections which are longitudinally adjustable to thereby vary the effective surface area of said shelf structure with each of said sections being provided at their free ends with attaching means releasably engageable with said support bars.

9. An article transporting apparatus comprising a base platform having an upper article supporting surface and including ground engaging means secured thereto for facilitating movement, horizontally disposed track means carried by said base platform in upwardly spaced relationship to the article supporting surface thereof, one of said track means being disposed adjacent each longitudinal marginal edge portion and extending substantially the length of said platform, at least two vertically disposed struts carried by each of said track means and extending substantially between said track means and the article supporting surface of said base platform, each of said struts being attached to respective track means by means permitting displacement therealong independently of each other strut, at least one support bar carried by and extending between each pair of struts which are carried by opposite track means, each of said bars being adjustably connected at each end to a respective one of said struts permitting vertical displacement thereof to a selected, horizontally disposed position, and at least one shelf structure adapted to extend between and be supported on a pair of said support bars disposed in longitudinally spaced relationship at the same vertical elevation, said shelf structure having means attached thereto at opposite ends detachably engaging a respective one of said support bars.

10. In an article supporting apparatus comprising a base structure, said base structure being provided with surface engaging means for supporting it, guide rail means mounted on said base structure including at least two elongated guide rails disposed in spaced parallel relationship and supported in elevated, longitudinally extending relationship to said base structure, at least two elongated struts carried by each of said guide rails, each of said struts being vertically suspended from the respective guide rail by means facilitating selective positioning of the struts longitudinally of said guide rails in transversely opposed pairs, at least one elongated support bar carried by each pair of oppositely positioned struts and extending transversely of said base structure, each of said bars being vertically positionable on a respective pair of struts at a selected elevation.

References Cited

UNITED STATES PATENTS

| | | | |
|---|---|---|---|
| 1,925,371 | 9/1933 | Charter | 211—153 |
| 2,060,620 | 11/1936 | Janssen | 211—162 |
| 2,195,263 | 3/1940 | Seibert | 211—153 |
| 2,600,298 | 6/1952 | Jarrett | 211—162 X |
| 2,951,594 | 9/1960 | Strinning et al. | 106—108 X |
| 3,102,641 | 9/1963 | Konstant et al. | 211—148 |

ROY D. FRAZIER, *Primary Examiner.*

CLAUDE A. LE ROY, *Examiner.*

W. D. LOULAN, *Assistant Examiner.*